US011479948B2

(12) United States Patent
Anderson et al.

(10) Patent No.: US 11,479,948 B2
(45) Date of Patent: Oct. 25, 2022

(54) REMOTE CONTROL CONSOLE FOR A MACHINE

(71) Applicant: CATERPILLAR INC., Peoria, IL (US)

(72) Inventors: Randall Todd Anderson, Peoria, IL (US); Michael William Bridenbaugh, Sewickley, PA (US)

(73) Assignee: Caterpillar Inc., Peoria, IL (US)

( * ) Notice: Subject to any disclaimer, the term of this patent is extended or adjusted under 35 U.S.C. 154(b) by 241 days.

(21) Appl. No.: 16/813,533

(22) Filed: Mar. 9, 2020

(65) Prior Publication Data

US 2021/0277628 A1    Sep. 9, 2021

(51) Int. Cl.
*E02F 9/20* (2006.01)
*G05D 1/00* (2006.01)
*G05D 1/02* (2020.01)
*G05G 9/047* (2006.01)

(52) U.S. Cl.
CPC ............ *E02F 9/205* (2013.01); *E02F 9/2004* (2013.01); *G05D 1/0016* (2013.01); *G05D 1/0022* (2013.01); *G05D 1/0223* (2013.01); *G05G 9/047* (2013.01); *G05D 2201/0202* (2013.01)

(58) Field of Classification Search
CPC ...... E02F 9/205; E02F 9/2004; G05D 1/0016; G05D 1/0022; G05D 1/0223; G05D 2201/0202; G05G 9/047; G05G 9/04792
See application file for complete search history.

(56) References Cited

U.S. PATENT DOCUMENTS

| 5,551,524 | A | 9/1996 | Yamamoto et al. |
| 8,428,791 | B2 | 4/2013 | Carlsson |
| 9,228,321 | B1 | 1/2016 | Stratton et al. |
| 2009/0318263 | A1* | 12/2009 | Yuet ............... B60W 30/18109 477/92 |
| 2017/0284316 | A1* | 10/2017 | Hansen ................. E02F 9/2232 |
| 2020/0299930 | A1* | 9/2020 | Wuisan ................. E02F 9/2004 |

* cited by examiner

*Primary Examiner* — Anne Marie Antonucci
*Assistant Examiner* — Jingli Wang
(74) *Attorney, Agent, or Firm* — Finnegan, Henderson, Farabow, Garrett & Dunner, LLP

(57) ABSTRACT

A remote control console or operator's station includes a proportional travel control joystick that effects continuous changes in machine travel speed through movement of the joystick away from a central-biased position, a sensor that measures progressively changing positions of the joystick, and an electronic controller communicatively coupled to the sensor and the joystick. The electronic controller is programmed to perform a closed loop control including mapping the progressively changing positions of the joystick to corresponding desired machine travel speeds, and adjusting the speeds of an engine used to propel the machine and the amounts of service braking used to slow the machine to achieve desired machine travel speeds.

20 Claims, 3 Drawing Sheets

REMOTE CONTROL CONSOLE FOR A MACHINE

TECHNICAL FIELD

The present disclosure relates generally to a machine remote control console, and more particularly, to a machine remote control console that enables machine speed control with a proportional travel control joystick.

BACKGROUND

Some earth moving machines, for example dozers, motor graders, wheel loaders, and snow plows, have a front-mounted work tool such as a blade, bucket, or plow for pushing or carrying material. These work tools can be tilted about a first horizontal axis that is generally perpendicular to the work tool (i.e., aligned with a travel direction), pitched about a second horizontal axis that is generally parallel to the work tool, and lifted relative to a ground surface. Tilting can be accomplished by extending a hydraulic cylinder located at a first side of the work tool, while simultaneously retracting a hydraulic cylinder located at an opposing side of the work tool. Pitching can be accomplished by extending or retracting both hydraulic cylinders in the same direction at the same time. Lifting of the work tool can be accomplished through extension of a separate lift cylinder. Existing hydraulic systems utilize different combinations of input devices to regulate the tilting, pitching, and lifting operations. Primary operator inputs for mobile vehicle motion include transmission direction (forward, neutral, or reverse), transmission speed setting, steering direction and magnitude, engine speed, and application of service brakes. Because there are multiple inputs to be controlled, these inputs generally require an operator of the machine to use both hands and both feet. In some existing dozers the transmission direction, transmission speed setting, and steering direction and magnitude are combined into a left-hand joystick. With a high idle machine such as a dozer, a right food pedal is often used to decelerate the engine speed from high idle toward a fully decelerated engine speed when slowing down the travel speed of the machine. A left foot pedal is often used in conjunction with the right foot pedal, with the left foot pedal controlling the service brakes for the machine.

When a machine is being remotely controlled, such as by a portable console which is hand-held or supported by a body harness, or at a remote operator station, in some implementations there may be two joysticks, with the left joystick being used for control of transmission speed settings and steering, and the right joystick being used for control of a blade or other work tool. With a remote control console the operator must control all functions of the machine with two hands and no foot pedals. The left joystick may have two or more control axes, with a left-right axis being used for steering direction and magnitude, and a front-back axis being used to set transmission direction. The joystick may also have a vertical axis about which it can be rotated, with rotation of the joystick about the vertical axis resulting in changes to the transmission speed settings. Conventional remote control consoles may include fingertip-controlled paddles that are used by the operator in place of a decelerator foot pedal and a service brake foot pedal. An exemplary remote control system for a work machine is disclosed in U.S. Pat. No. 8,428,791 to Carlsson, issued on Apr. 23, 2013 (the '791 patent). Specifically, the '791 patent discloses a remote control system for a machine, with the system including at least one control stick or joystick and a number of buttons, levers, and/or knobs for operating the different travel and working functions of the machine.

Although the remote control system of the '791 patent includes joysticks and other input devices having different functions in different modes, the '791 does not disclose a control system that enables proportional travel control of a machine by movement of a joystick without the use of foot pedals, wherein movement of the joystick results in continuously progressive control of engine speed and automatic braking mapped to a desired travel speed for the machine.

The remote control console or operator's station of the present disclosure addresses one or more of the needs set forth above and/or other problems of the prior art.

SUMMARY

In one aspect, the present disclosure is directed to a remote control console including a plurality of input devices configured for controlling a machine having a work tool. The remote control console may include a proportional travel control joystick configured to perform continuous changes in machine travel speed through movement of the joystick away from a central-biased position, a sensor configured to generate progressively changing signals indicative of progressively changing positions of the joystick as the joystick is moved away from the central-biased position, and an electronic controller communicatively coupled to the sensor and the joystick. The electronic controller may be programmed to receive the signals from the sensor, determine the progressively changing positions of the joystick from the sensor signals, and perform a closed loop control. The closed loop control may include mapping the progressively changing positions of the joystick to corresponding desired machine travel speeds, determining simultaneous combinations of the speeds of an engine used to propel the machine and the amounts of service braking used to slow the machine wherein the simultaneous combinations result in the desired machine travel speeds, generating control command signals to adjust the speed of the engine used to propel the machine and adjust an amount of service braking in accordance with the determined simultaneous combinations, determining a resulting machine travel speed and comparing the resulting machine travel speed to the desired machine travel speed, and further adjusting the speed of the engine used to propel the machine and the amount of service braking to reduce any difference between the resulting machine travel speed and the desired machine travel speed below a predetermined threshold level.

In another aspect, the present disclosure is directed to a remote operator station used for remotely controlling a machine. The operator station may include an operator's seat, one or more display screens mounted in front of the operator's seat and configured to display a view indicative of a view from the perspective of an operator's cabin on the machine, a proportional travel control joystick configured to perform continuous changes in machine travel speed through movement of the joystick away from a central-biased position, a sensor configured to generate progressively changing signals indicative of progressively changing positions of the joystick as the joystick is moved away from the central-biased position, and an electronic controller communicatively coupled to the sensor and the joystick. The electronic controller may be programmed to receive the signals from the sensor, determine the progressively changing positions of the joystick from the sensor signals, and perform a closed loop control. The closed loop control may include mapping the progressively changing positions of the joystick to corresponding desired machine travel speeds, determining simultaneous combinations of the speeds of an engine used to propel the machine and the amounts of service braking used to slow the machine wherein the simultaneous combinations result in the desired machine travel speeds, generating control command signals to adjust the speed of the engine used to propel the machine and adjust an amount of service braking in accordance with the determined simultaneous combinations, determining a resulting machine travel speed and comparing the resulting machine travel speed to the desired machine travel speed, and further adjusting the speed of the engine used to propel the machine and the amount of service braking to reduce any difference between the resulting machine travel speed and the desired machine travel speed below a predetermined threshold level.

In yet another aspect, the present disclosure is directed to a method of remotely controlling a work machine using one of a remote control console or operator's station, wherein the one of a remote control console or operator's station includes a proportional travel control joystick configured to perform continuous changes in machine travel speed through movement of the joystick away from a central-biased position, a sensor configured to generate progressively changing signals indicative of progressively changing positions of the joystick as the joystick is moved away from the central-biased position, and an electronic controller communicatively coupled to the sensor and the joystick. The method may include receiving the signals from the sensor by the electronic controller, determining, using the electronic controller, the progressively changing positions of the joystick from the sensor signals, and performing a closed loop control, using the electronic controller. The closed loop control may include mapping the progressively changing positions of the joystick to corresponding desired machine travel speeds, and determining simultaneous combinations of the speeds of an engine used to propel the machine and the amounts of service braking used to slow the machine, wherein the simultaneous combinations result in the desired machine travel speeds. The closed loop control performed by the electronic controller may further include generating control command signals to adjust the speed of the engine used to propel the machine and adjust an amount of service braking in accordance with the determined simultaneous combinations of engine speed and amount of service braking. As the machine travel speed is changed, the electronic controller may determine resulting machine travel speeds from inputs such as transmission output speeds and/or location signals from GPS, etc., and compare the resulting machine travel speeds to the desired and/or expected machine travel speeds associated with each position of the joystick. The electronic controller may then command further adjustments to the speed of the engine used to propel the machine and the amount of service braking to reduce any difference between the resulting machine travel speed and the desired or expected machine travel speed below a predetermined threshold level.

DETAILED DESCRIPTION

Figure 1:
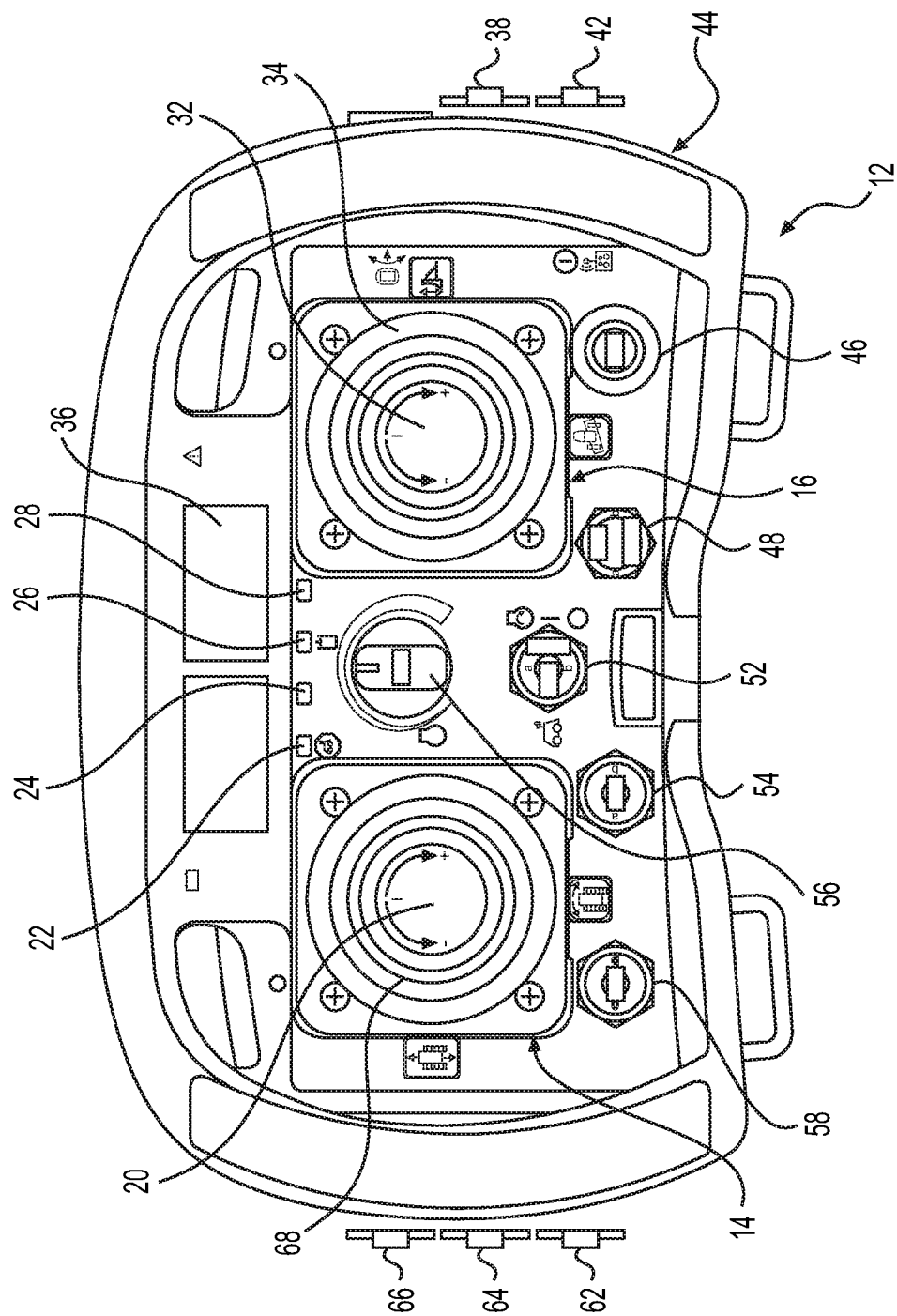
FIG. 1 is a top plan view of an exemplary disclosed remote control console.
Figure 2:
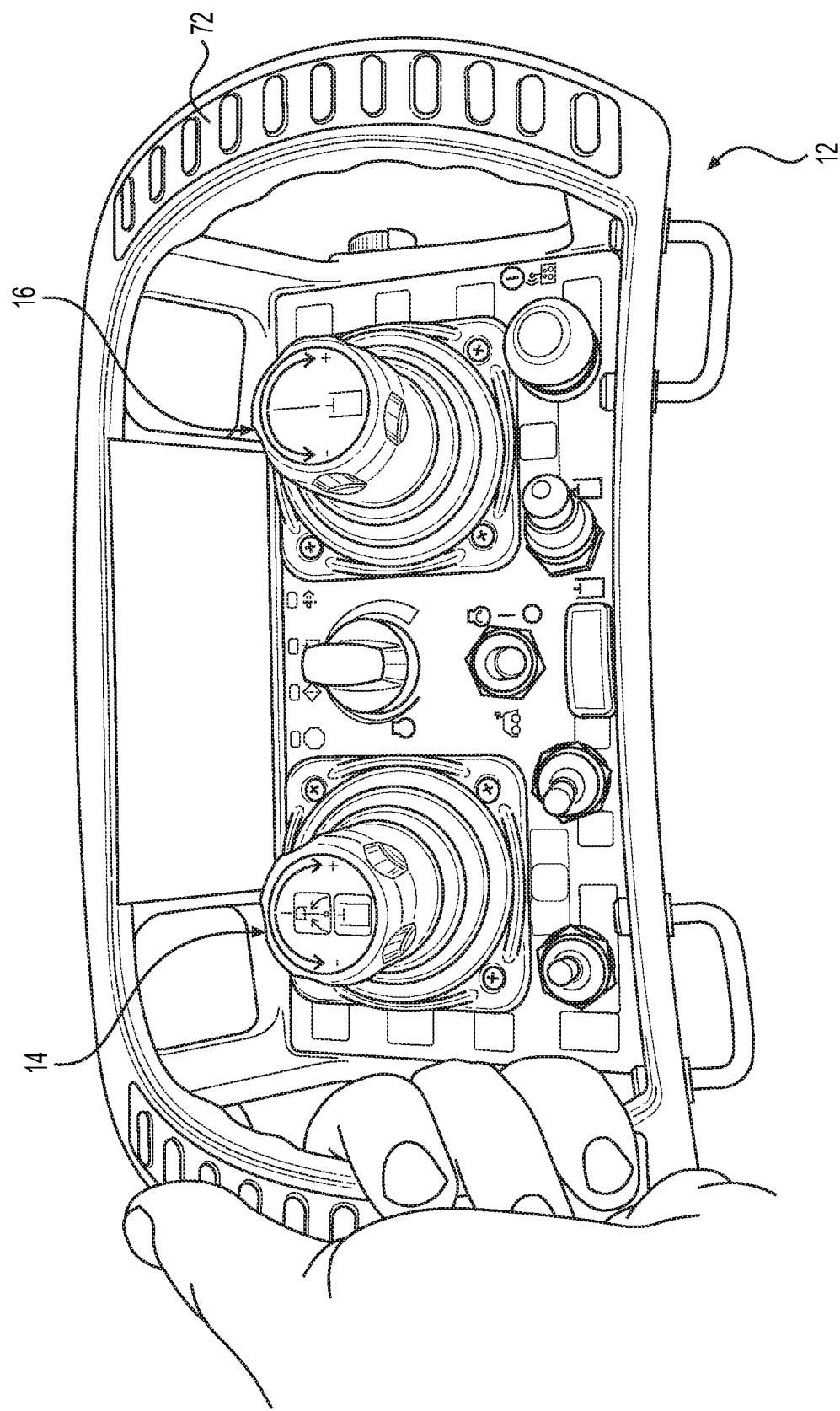
FIG. 2 is a perspective view of the exemplary remote control console of FIG. 1.

FIGS. 1 and 2 illustrate an exemplary remote control console including at least one joystick used in controlling various operational functions of a machine having multiple systems and components that cooperate to accomplish a task. The machine controlled by the remote control console may embody a mobile machine that performs some type of operation associated with an industry such as mining, construction, farming, transportation, or another industry known in the art. For example, an exemplary machine may be a material moving machine such as a dozer, a motor grader, a wheel loader, a snow plow, or similar machine. The machine may include an implement system configured to move a work tool, a drive system for propelling the machine, a power source that provides power to the implement system and drive system, and an operator station that provides for control of the implement system, drive system, and/or power system.

The implement system may include a linkage structure acted on by fluid actuators to move a work tool. Specifically, the implement system may include a push frame or other fixturing component or assembly that is connected to a drive system and an edge or other portion of a work tool. In some implementations, one or more hydraulic cylinders (lift cylinders) may pivotally connect the push frame to a machine frame, and be functional to raise and lower the work tool relative to a ground surface. Additional hydraulic cylinders (referred to as yaw cylinders) may pivotally connect the push frame to opposing side edges of the work tool, and be functional to yaw the work tool about a vertical axis. Still further linkage members and hydraulic cylinders or other actuators may connect the push frame to other portions of a work tool, and be functional to roll the work tool about a horizontal axis. In the case of a motor grader, a joystick may include push buttons for incremental up and down shifting, or a roller for continuously variable up and down shifting. The joystick may also include additional push buttons for controlling the amount of wheel lean, still further buttons located, for example, on a side of the joystick for providing grade control and possibly control of a snow wing, a toggle switch or rocker switch that can be activated in multiple different directions to control various functions, and the ability to rotate the entire joystick about a vertical axis through the joystick for controlling articulation of the motor grader front and rear portions, and for controlling rotational movement of a circle board supporting a main blade. The joystick may also be configured such that movement of the joystick in frontward and rearward directions may control lifting and lowering of the main blade associated with the joystick. An arm may extend vertically upward away from the center of a push frame toward an upper edge of a work tool, and a hydraulic cylinder (pitch cylinder) may pivotally connect a distal tip of the arm to the upper edge. A pitch cylinder may be functional to pitch a work tool about a horizontal axis that is generally perpendicular to a travel direction of the machine. An additional hydraulic cylinder (roll cylinder) may extend from a tip end of the arm to a point on the work tool located between the arm and a side edge of the work tool. The roll cylinder may be functional to roll the work tool about a horizontal axis. The horizontal axis about which the roll cylinder functions may be generally aligned with the travel direction of the machine.

Numerous different work tools may be attachable to a single machine and operator controllable. A work tool may include any device used to perform a particular task such as, for example, a blade, a bucket, a plow, or another task-performing device known in the art. A work tool could additionally be driven to slide, swing, open and close, or move in another manner known in the art.

A drive system of the machine may include undercarriage assemblies and rotating endless tracks or other ground engagement members. Each undercarriage assembly may also include a base member that may support the ends of a push frame engaged with a work tool. It is contemplated that the drive system could alternatively include traction devices other than tracks, if desired, such as wheels, belts, or other known traction devices.

A power source for the machine may embody an engine such as, for example, a diesel engine, a gasoline engine, a gaseous fuel-powered engine, or any other type of combustion engine known in the art. It is contemplated that the power source may alternatively embody a non-combustion source of power such as a fuel cell, a power storage device, or another known source. The power source may produce a mechanical or electrical power output that is used to propel the machine via the drive system and that can be converted to hydraulic power for moving hydraulic cylinders used to operate various components and work tools of the machine.

An operator station may include devices that receive input from a machine operator indicative of desired machine maneuvering. In a case where an operator controls the machine remotely, the input devices may be included on a remote control console such as remote control console 12 illustrated in FIGS. 1 and 2, or the operator's station may include an operator's chair with a joystick on each arm of the operator's chair. Remote control console 12 may be a portable console, which is hand-held or supported by a body harness, or located in a stationary position at a remote operator station such as the operator station shown in FIG. 3. Alternative embodiments of a remote operator's station may include a joystick according to the present disclosure mounted directly on one of the arms of an operator's chair. In some implementations, remote control console 12 may include two joysticks, with the left joystick being used for control of transmission speed settings and steering of the machine, and the right joystick being used for control of a blade or other work tool. With a remote control console such as remote control console 12, or at a remote operator's station for an operator who does not have the ability to operate foot pedals, the operator must control all functions of the machine with two hands and no foot pedals. The left joystick may have two or more control axes, with a left-right axis being used for steering direction and magnitude, and a front-back axis being used to set transmission direction and machine travel speed. The joystick may also have a vertical axis about which it can be rotated, with rotation of the joystick about the vertical axis resulting in changes to the transmission speed settings.

Remote control console 12 may include one or more input devices and indicators such as left-hand and right-hand joysticks 14, 16, a toggle switch or roller 20 located on joystick 14 for controlling max ground speed down and up, indicator lights 22, 24, 26, 28 indicative of aspects such as software stop, fault indication, implement lock indication, and park brake indication, work tool controls 32, 34, configured for controlling work tool functions such as blade angle/pitch/lift/tilt, lights and horn 36, 38, and additional indicators and switches 42, 44, 46, 48, 52, 54, 56, 58, 62, 64, 66, 68 performing additional functions such as controlling engine throttle, ignition switch, work lights, fire suppression, etc. The various input devices on remote control console 12 such as joysticks 14, 16 may be manipulated by an operator to initiate movement of the machine by producing proportional displacement signals that are indicative of desired maneuvering. In the disclosed embodiment, left-hand joystick 14 may be a joystick associated with control of transmission direction and travel speed as well as steering of the machine, while right-hand joystick 16 may be a joystick associated with control of lifting, pitching, rolling, and yawing movements of a work tool. It is contemplated that input devices other than a joystick such as, for example, a paddle, a lever, a rocker switch, and other devices known in the art, may additionally be provided on remote control console 12 for movement control of machine 10, if desired.

Remote control console 12 of FIGS. 1 and 2 may include a plurality of input devices configured for controlling a machine having a work tool. In the exemplary embodiment shown in FIGS. 1 and 2, remote control console 12 may include a proportional travel control joystick 14 configured to perform continuous changes in machine travel speed through movement of joystick 14 away from a central-biased position. In one exemplary embodiment, remote control console 12 may also include a sensor (not shown) associated with joystick 14, which may be configured to generate progressively changing signals indicative of progressively changing positions of the joystick as the joystick is moved away from the central-biased position. An electronic controller included on remote control console 12, or connected wirelessly or through a wired bus to the console may be communicatively coupled to the sensor and joystick 14.

The electronic controller may include a memory, a secondary storage device, a clock, and one or more processors that cooperate to accomplish a task consistent with the present disclosure. Numerous commercially available microprocessors can be configured to perform the functions of the electronic controller. It should be appreciated that the electronic controller could readily embody a general machine controller capable of controlling numerous other functions of the machine. Various known circuits may be associated with the electronic controller, including signal-conditioning circuitry, communication circuitry, and other appropriate circuitry. It should also be appreciated that the electronic controller may include one or more of an application-specific integrated circuit (ASIC), a field-programmable gate array (FPGA), a computer system, and a logic circuit configured to allow the controller to function in accordance with the present disclosure.

The electronic controller may be programmed to receive the signals indicative of the progressively changing positions of joystick 14 from the associated position sensor, and determine the progressively changing positions of the joystick from the sensor signals. The electronic controller may be further programmed to perform a closed loop control, wherein the closed loop control includes mapping the progressively changing positions of the joystick to corresponding desired or expected machine travel speeds, and then determining simultaneous combinations of the speeds of an engine used to propel the machine and the amounts of service braking used to slow the machine, wherein the simultaneous combinations result in the desired machine travel speeds. The functions of controlling the speeds of the engine in order to allow the engine to idle at high speed or to slow down the engine speed would traditionally require operation of one foot pedal on the machine, and application of service brakes would traditionally require operation of a second foot pedal on the machine. In the disclosed embodiments of this disclosure, movement of joystick 14 on remote control console 12 away from a central-biased position in either a forward direction or a rearward direction may result in progressive, simultaneous changes to engine speed and amount of service braking, eliminating any requirement for foot pedals or other finger-operated paddles for controlling engine speed and service braking on the remote control console. In some exemplary implementations, the map relating amounts of movement of joystick 14 to expected machine travel speeds and/or associated physics-based equations defining relationships between combinations of engine speed and service braking with machine travel speed may be based on empirical or historical data for the particular machine or type of machine operating under similar conditions.

As joystick 14 is moved in a forward direction away from a central-biased position, the electronic controller may be programmed to interpret the progressively changing positions of the joystick from the sensor data and generate control command signals to progressively adjust the speed of the engine used to propel the machine and an amount of service braking used to slow the machine in accordance with the determined simultaneous combinations of engine speed and service braking. For example, movement of joystick 14 in a forward direction away from its central-biased position may result in shifting of the transmission into a forward gear while gradually increasing the speed of the engine and simultaneously reducing the amount of service braking, resulting in an increase of the travel speed of the machine in a forward direction. Movement of joystick 14 in a rearward direction away from its central-biased position may result in shifting of the transmission into a rearward gear while gradually increasing the speed of the engine and simultaneously reducing the amount of service braking, resulting in an increase of the travel speed of the machine in a rearward direction.

The electronic controller may be programmed to perform the closed loop control by determining a resulting machine travel speed as joystick 14 is progressively moved in either the forward or rearward directions, and comparing the resulting machine travel speed to the expected machine travel speed associated with the position of joystick 14, and further adjusting the speed of the engine used to propel the machine and the amount of service braking to reduce any difference between the resulting machine travel speed and the desired and expected machine travel speed below a predetermined threshold level. Remote control console 12 may include joystick 14 further configured such that an increase in the amount of movement of the joystick in a first direction away from the central-biased position results in an increase in the machine travel speed in the first direction and an increase in the amount of movement of the joystick in a second direction opposite from the first direction and away from the central-biased position results in an increase in the machine travel speed in the second direction. Joystick 14 may be configured to be moved in forward and rearward directions from the central-biased position in order to generate signals indicative of operator commanded changes in the travel speed of the machine in forward and rearward directions, respectively. Additionally, joystick 14 may be still further configured to be moved in left and right directions from the central-biased position in order to generate signals indicative of operator commanded changes in the travel direction of the machine and in the travel speed of the machine.

Remote control console 12 may include joystick 14 configured such that in the central-biased position the joystick generates signals indicative of a state in which the speed of the engine used to propel the machine is fully decelerated and the service brakes used to slow travel speed of the machine are fully applied. Remote control console 12 may further include a second joystick 16 configured to generate signals indicative of an operator command to change positions of a work tool. In the exemplary embodiment of FIGS. 1 and 2, remote control console 12 includes left-hand joystick 14 configured as the above-described proportional travel control joystick, while right-hand joystick 16 is configured as a machine tool control joystick. In various alternative embodiments, other arrangements and functions may be included depending on the particular type of machine being controlled by remote control console 12.

Figure 3:
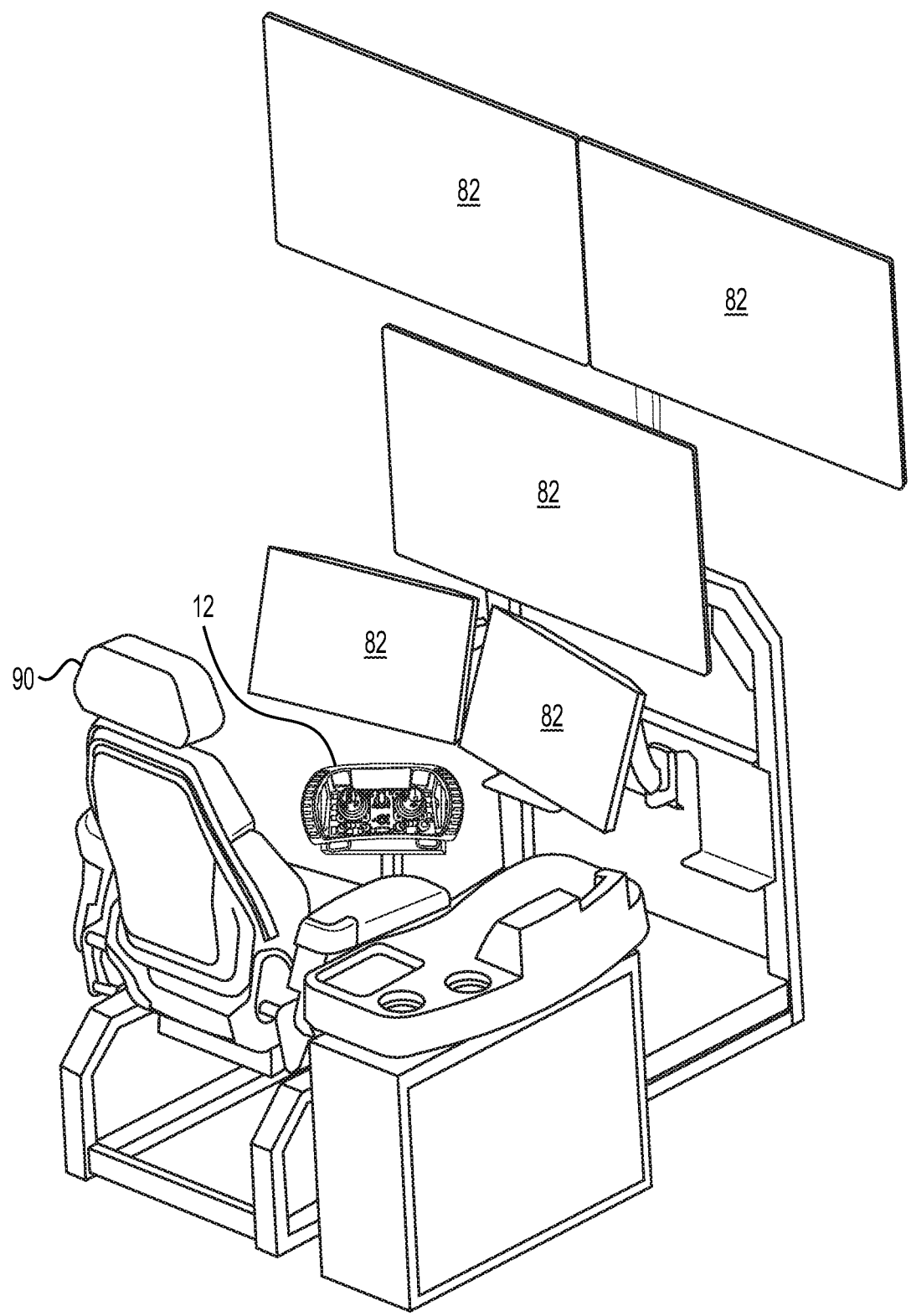
FIG. 3 is a pictorial illustration of a remote operator's station including a remote control console.

FIG. 3 illustrates a remote operator station used for remotely controlling a machine, the operator station may include an operator's seat 90, with a remote control console 12, such as shown in FIGS. 1 and 2, supported in front of the operator sitting in operator's seat 90, and one or more screens 82 positioned in the view of the operator. The one or more display screens 82 mounted in front of operator's seat 90 may be configured to display a view indicative of a view from the perspective of an operator's cabin on the machine. Alternative embodiments of the remote operator's station may include a proportional travel control joystick with all of the same functions and capabilities discussed above for joystick 14, except with the joystick mounted on one of the arms of the operator's seat 90 rather than on a remote control console positioned in front of the operator.

INDUSTRIAL APPLICABILITY

The disclosed remote control console may be used to remotely control operation of any machine having a work tool that is capable of movement in multiple directions. The disclosed remote control console may be particularly useful when applied to a motor grader or a dozer having a blade where independent control over lifting, pitching, rolling, and yawing is beneficial. Independent control over blade lifting, pitching, rolling, and yawing may be possible through separate regulation of independent hydraulic cylinders under the direction of a machine operator. The disclosed remote control console also provides a compact and lightweight unit that can be carried by a machine operator, with handles 72 providing a convenient means for holding the remote control console when not actually operating joysticks 14 and 16 along with other input devices contained on remote control console 12. A shoulder harness or other device may be used to support remote control console in a hands-free position convenient for the operator to be able to manipulate joysticks 14 and 16, and other input devices contained on the console.

Remote control console 12 includes proportional travel control joystick 14 configured to perform continuous changes in machine travel speed through movement of the joystick away from a central-biased position, a sensor configured to generate progressively changing signals indicative of progressively changing positions of the joystick as the joystick is moved away from the central-biased position, and an electronic controller communicatively coupled to the sensor and the joystick. In one exemplary implementation of a method for using remote control console 12, the method may include receiving the signals from the sensor by the electronic controller, determining, using the electronic controller, the progressively changing positions of the joystick from the sensor signals, and performing a closed loop control, using the electronic controller. As discussed above, alternative embodiments of a remote operator's station may include a proportional travel control joystick with all of the same functions and capabilities as joystick 14, with the joystick being mounted directly on one of the arms of the operator's chair 90.

The closed loop control performed by the electronic controller may include mapping the progressively changing positions of the joystick to corresponding desired machine travel speeds, and determining simultaneous combinations of the speeds of an engine used to propel the machine and the amounts of service braking used to slow the machine, wherein the simultaneous combinations result in the desired machine travel speeds. The closed loop control performed by the electronic controller may further include generating control command signals to adjust the speed of the engine used to propel the machine and adjust an amount of service braking in accordance with the determined simultaneous combinations of engine speed and amount of service braking.

As the machine travel speed is changed, the electronic controller may determine resulting machine travel speeds from inputs such as transmission output speeds and/or location signals from GPS, etc., and compare the resulting machine travel speeds to the desired and/or expected machine travel speeds associated with each position of the joystick. The electronic controller may then command further adjustments to the speed of the engine used to propel the machine and the amount of service braking to reduce any difference between the resulting machine travel speed and the desired or expected machine travel speed below a predetermined threshold level.

It will be apparent to those skilled in the art that various modifications and variations can be made to the remote control console of the present disclosure or to the proportional travel control joystick of the present disclosure without departing from the scope of the disclosure. Other embodiments will be apparent to those skilled in the art from consideration of the specification and practice of the disclosed apparatus and methods. It is intended that the specification and examples be considered as exemplary only, with a true scope of the disclosure being indicated by the following claims and their equivalent.

What is claimed is:

1. A remote control console including a plurality of input devices configured for controlling a machine having a work tool, the remote control console comprising:
   a proportional travel control joystick configured to perform continuous changes in machine travel speed through movement of the joystick away from a central-biased position;
   a sensor configured to generate progressively changing signals indicative of progressively changing positions of the joystick as the joystick is moved away from the central-biased position; and
   an electronic controller communicatively coupled to the sensor and the joystick, the electronic controller being programmed to:
      receive the signals from the sensor;
      determine the progressively changing positions of the joystick from the sensor signals; and
      perform a closed loop control, comprising:
         mapping the progressively changing positions of the joystick to corresponding desired machine travel speeds;
         determining simultaneous combinations of the speeds of an engine used to propel the machine and the amounts of service braking used to slow the machine wherein the simultaneous combinations result in the desired machine travel speeds;
         generating control command signals to adjust the speed of the engine used to propel the machine and adjust an amount of service braking in accordance with the determined simultaneous combinations;
         determining a resulting machine travel speed and comparing the resulting machine travel speed to the desired machine travel speed; and
         further adjusting the speed of the engine used to propel the machine and the amount of service braking to reduce any difference between the resulting machine travel speed and the desired machine travel speed below a predetermined threshold level.

2. The remote control console of claim 1, wherein the joystick is further configured such that an increase in the amount of movement of the joystick in a first direction away from the central-biased position results in an increase in the machine travel speed in the first direction and an increase in the amount of movement of the joystick in a second direction opposite from the first direction and away from the central-biased position results in an increase in the machine travel speed in the second direction.

3. The remote control console of claim 2, wherein the joystick is further configured to be moved in forward and rearward directions from the central-biased position in order to generate signals indicative of operator commanded changes in the travel speed of the machine in forward and rearward directions, respectively.

4. The remote control console of claim 3, wherein the joystick is further configured to be moved in left and right directions from the central-biased position in order to generate signals indicative of operator commanded changes in the travel direction of the machine and in the travel speed of the machine.

5. The remote control console of claim 4, wherein:
the joystick is further configured such that movement of the joystick in the forward direction from the central-biased position results in a progressive increase in the travel speed of the machine in a forward direction caused by a progressive increase in the speed of the engine used to propel the machine accompanied by a progressive decrease in the amount of service braking applied to reduce the speed of the machine.

6. The remote control console of claim 4, wherein:
the joystick is further configured such that movement of the joystick in the rearward direction from the central-biased position results in a progressive increase in the travel speed of the machine in a rearward direction caused by a progressive increase in the speed of the engine used to propel the machine accompanied by a progressive decrease in the amount of service braking applied to reduce the speed of the machine.

7. The remote control console of claim 4, wherein:
the joystick is further configured such that in the central-biased position the joystick generates signals indicative of a state in which the speed of the engine used to propel the machine is fully decelerated and the service brakes used to slow travel speed of the machine are fully applied.

8. The remote control console of claim 1, further including a second joystick configured to generate signals indicative of an operator command to change positions of a work tool.

9. The remote control console of claim 8, wherein the proportional travel control joystick is a left-hand joystick and the second joystick is a right-hand joystick.

10. A remote operator station used for remotely controlling a machine, the operator station comprising:
an operator's seat;
one or more display screens mounted in front of the operator's seat and configured to display a view indicative of a view from the perspective of an operator's cabin on the machine;
a proportional travel control joystick configured to perform continuous changes in machine travel speed through movement of the joystick away from a central-biased position;
a sensor configured to generate progressively changing signals indicative of progressively changing positions of the joystick as the joystick is moved away from the central-biased position; and
an electronic controller communicatively coupled to the sensor and the joystick, the electronic controller being programmed to:
receive the signals from the sensor;
determine the progressively changing positions of the joystick from the sensor signals; and
perform a closed loop control, comprising:
mapping the progressively changing positions of the joystick to corresponding desired machine travel speeds;
determining simultaneous combinations of the speeds of an engine used to propel the machine and the amounts of service braking used to slow the machine wherein the simultaneous combinations result in the desired machine travel speeds;
generating control command signals to adjust the speed of the engine used to propel the machine and adjust an amount of service braking in accordance with the determined simultaneous combinations;
determining a resulting machine travel speed and comparing the resulting machine travel speed to the desired machine travel speed; and
further adjusting the speed of the engine used to propel the machine and the amount of service braking to reduce any difference between the resulting machine travel speed and the desired machine travel speed below a predetermined threshold level.

11. The remote operator station of claim 10, wherein the joystick is further configured such that an increase in the amount of movement of the joystick in a first direction away from the central-biased position results in an increase in the machine travel speed in a forward direction and an increase in the amount of movement of the joystick in a second direction opposite from the first direction and away from the central-biased position results in an increase in the machine travel speed in a reverse direction.

12. The remote operator station of claim 11, wherein the joystick is mounted on a remote control console positioned in front of the operator's seat and is further configured to be moved in forward and rearward directions from the central-biased position in order to generate signals indicative of operator commanded changes in the travel speed of the machine in forward and rearward directions, respectively.

13. The remote operator station of claim 11, wherein the joystick is further configured to be moved in left and right directions from the central-biased position in order to generate signals indicative of operator commanded changes in the travel direction of the machine and in the travel speed of the machine.

14. The remote operator station of claim 13, wherein the joystick is further configured such that movement of the joystick in the forward direction from the central-biased position results in a progressive increase in the travel speed of the machine in a forward direction caused by a progressive increase in the speed of the engine used to propel the machine accompanied by a progressive decrease in the amount of service braking applied to reduce the speed of the machine.

15. The remote operator station of claim 13, wherein the joystick is further configured such that movement of the joystick in the rearward direction from the central-biased position results in a progressive increase in the travel speed of the machine in a rearward direction caused by a progressive increase in the speed of the engine used to propel the machine accompanied by a progressive decrease in the amount of service braking applied to reduce the speed of the machine.

16. The remote operator station of claim 13, wherein the joystick is further configured such that in the central-biased position the joystick generates signals indicative of a state in which the speed of the engine used to propel the machine is fully decelerated and the service brakes used to slow travel speed of the machine are fully applied.

17. The remote operator station of claim 10, further including a second joystick configured to generate signals indicative of an operator command to change positions of a work tool.

18. A method of remotely controlling a work machine using one of a remote control console or a remote operator's station, wherein the one of a remote control console or a remote operator's station comprises:
a proportional travel control joystick configured to perform continuous changes in machine travel speed through movement of the joystick away from a central-biased position;
a sensor configured to generate progressively changing signals indicative of progressively changing positions of the joystick as the joystick is moved away from the central-biased position; and
an electronic controller communicatively coupled to the sensor and the joystick, the method comprising:
receiving the signals from the sensor by the electronic controller;
determining, using the electronic controller, the progressively changing positions of the joystick from the sensor signals; and
performing a closed loop control, using the electronic controller, the closed loop control comprising:
mapping the progressively changing positions of the joystick to corresponding desired machine travel speeds;
determining simultaneous combinations of the speeds of an engine used to propel the machine and the amounts of service braking used to slow the machine wherein the simultaneous combinations result in the desired machine travel speeds;
generating control command signals to adjust the speed of the engine used to propel the machine and adjust an amount of service braking in accordance with the determined simultaneous combinations;

determining a resulting machine travel speed and comparing the resulting machine travel speed to the desired machine travel speed; and further adjusting the speed of the engine used to propel the machine and the amount of service braking to reduce any difference between the resulting machine travel speed and the desired machine travel speed below a predetermined threshold level.

19. The method of claim 18, wherein an increase in the amount of movement of the joystick in a first direction away from the central-biased position results in an increase in the machine travel speed in a forward direction and an increase in the amount of movement of the joystick in a second direction opposite from the first direction and away from the central-biased position results in an increase in the machine travel speed in a reverse direction.

20. The method of claim 19, wherein:

the joystick is moved in forward and rearward directions from the central-biased position in order to generate signals indicative of operator commanded changes in the travel speed of the machine in forward and rearward directions, respectively; and the joystick is moved in left and right directions from the central-biased position in order to generate signals indicative of operator commanded changes in the travel direction of the machine and in the travel speed of the machine.

* * * * *